(12) United States Patent
Kirjavainen et al.

(10) Patent No.: US 6,197,239 B1
(45) Date of Patent: Mar. 6, 2001

(54) EXTRUSION APPARATUS AND METHOD FOR ORIENTING PLASTIC MATERIAL BY USING AN EXTRUSION APPARATUS

(75) Inventors: Kari Kirjavainen, Espoo; Jyri Järvenkylä, Hollola, both of (FI)

(73) Assignee: Nextrom Holding S.A., Ecublens (CH)

( * ) Notice: Subject to any disclaimer, the term of this patent is extended or adjusted under 35 U.S.C. 154(b) by 0 days.

(21) Appl. No.: 08/981,218

(22) PCT Filed: May 8, 1996

(86) PCT No.: PCT/FI96/00261

§ 371 Date: Apr. 8, 1998

§ 102(e) Date: Apr. 8, 1998

(87) PCT Pub. No.: WO97/01428

PCT Pub. Date: Jan. 16, 1997

(30) Foreign Application Priority Data

Jun. 26, 1995 (FI) .......................................... 953162
Sep. 20, 1995 (SE) .......................................... 9503272
Apr. 29, 1996 (FI) .......................................... 961822

(51) Int. Cl.[7] ............................. B29C 47/06; B29C 47/24
(52) U.S. Cl. ................. 264/209.2; 264/108; 264/171.29; 264/209.8; 264/211.1; 425/113; 425/133.1; 425/204; 425/377; 425/378.1; 425/379.1; 425/380; 425/381.2; 425/382.3; 425/462
(58) Field of Search ................................ 425/113, 133.1, 425/378.1, 379.1, 380, 381, 381.2, 382.3, 461, 462, 466, 467, 204, 377; 264/108, 171.29, 209.2, 209.8, 211.1

(56) References Cited

U.S. PATENT DOCUMENTS 3,314,108   4/1967   Wienand et al. .
3,425,455   2/1969   Kilpert et al. .................... 138/143
3,781,153 * 12/1973   Lukach et al. .................. 425/381.2

(List continued on next page.)

FOREIGN PATENT DOCUMENTS 568148   10/1975   (CH) .
372214    3/1923   (DE) .

(List continued on next page.)

OTHER PUBLICATIONS

Richard, K., et al. "Verfestigte Rohre Aus Ziegler–Polyathylen", *Kunatoffe*, VAL 50, NO 7, 1960, pp. 371–375.
Derwent's Abstract of JP50–24109 of Feb. 1993.
Derwent's Abstract of JP1–114418 of May 1989.
Derwent's Abstract of SU 1384394 of Mar., 1988.
Patent Abstract of Japan of JP 58–27040 of Feb. 17, 1983.

*Primary Examiner*—Harold Pyon
*Assistant Examiner*—Joseph Leyson

(57) ABSTRACT

An extrusion apparatus including at least one conical stator, and at least one conical rotor. The rotor is adapted for defibering or orienting a plastic material. The apparatus has an opening for receiving an elongate product or mandrel. The product or mandrel may be disposed in the apparatus such that, with the product or mandrel received in the opening, an extrusion conduit is defined in the opening between the product or mandrel and the rotor and stator. The rotor and stator are disposed with respect to one another to form a supply opening wherein the plastic material flows between the stator and rotor and is pressed into the extrusion conduit. A method for extrusion is also described involving the apparatus;

22 Claims, 6 Drawing Sheets

U.S. PATENT DOCUMENTS

| | | | |
|---|---|---|---|
| 3,784,339 | * | 1/1974 | Springfield ........................ 425/381.2 |
| 3,907,961 | * | 9/1975 | Carrow .............................. 425/380 |
| 4,021,170 | * | 5/1977 | Andersen et al. ................... 425/466 |
| 4,218,416 | * | 8/1980 | Gokcen ............................... 425/466 |
| 5,387,386 | | 2/1995 | Kirjavainen ......................... 264/173 |
| 5,648,104 | * | 7/1997 | El-Sobky ......................... 264/209.2 |

FOREIGN PATENT DOCUMENTS

| | | |
|---|---|---|
| 1092186 | 11/1960 | (DE) . |
| 2051390 | 4/1972 | (DE) . |
| 2256756 | 5/1973 | (DE) . |
| 0410503 | 1/1991 | (EP) . |
| 0472418 | 2/1992 | (EP) . |
| 89906779 | 3/1994 | (EP) . |
| 848423 | 9/1960 | (GB) . |
| 946371 | 1/1964 | (GB) . |
| 1114418 | 5/1989 | (JP) . |
| 5024109 | 2/1993 | (JP) . |
| 159841 | 11/1986 | (NO) . |
| 8401920 | 5/1984 | (WO) . |
| 8705856 | 10/1987 | (WO) . |
| 9524304 | 9/1995 | (WO) . |

\* cited by examiner

EXTRUSION APPARATUS AND METHOD FOR ORIENTING PLASTIC MATERIAL BY USING AN EXTRUSION APPARATUS

FIELD OF INVENTION

The invention relates to an extrusion apparatus for preparing a cylindrical plastic product or for coating the product at least with one layer of plastic, the extrusion apparatus comprising at least one conical stator, at least one conical rotor, and at least one conical supply opening between them for pressing the plastic material to be extruded into an extrusion conduit. The invention also relates to a method for defibering and/or orienting a plastic material during the manufacture or coating of a cylindrical plastic product with the aforementioned extrusion apparatus. The cylindrical plastic product may be for example a plastic pipe, a plastic film or some other similar product.

BACKGROUND OF INVENTION

Previously when pipes were coated, an outer pipe was first formed on top of the pipe to be coated. In such a case, it was not possible to provide the outer pipe with the desired orientation, for example. Further, when a long screw is used in the present manner, the pipe to be coated warms up.

Norwegian Published Specification 159,841 discloses a crosshead tool provided with a rotating mandrel in connection with the extruder. With this arrangement, it is possible to form, but not maintain, the desired orientation during the coating of a cable, even though the coating layer can be pressed at least in principle against the cable with pressure, so that the adhesion of the coating to the surface to be coated can be improved.

The purpose of the present invention is to avoid prior art problems and to produce an extrusion apparatus that provides the product with the primarily desired permanent orientation.

SUMMARY OF INVENTION

This aim is achieved with an apparatus according to the invention, which is mainly characterized in that at the end of the rotor there are means for defibering and/or orienting the plastic material.

The aforementioned means most preferably comprise a substantially cylindrical extension that extends to the extrusion conduit at the end of the rotor.

These means may also comprise openings extending through the rotor and/or its extension.

There may be an annular flange at the end of the rotor or its extension, the flange preferably comprising bores extending through it.

The method according to the invention is in turn characterized mainly in that the rotor or rotors are rotated so rapidly that the helical orientation has almost the same direction as the circumference, and that the cylindrical plastic product exiting the extrusion apparatus is drawn with a drawing device in such a way that the orientation of the plastic molecules in the circumferential direction is reduced, so that the orientation angle of the finished product is smaller, preferably about 50 to 60°.

With the rotor formed in the manner according to the invention, the plastic material to be extruded can be provided with helical orientation that can be made permanent by cooling the pipe or the piece to be coated in a suitable manner and possibly by also cooling the extrusion apparatus from the outside. The helical orientation is mainly produced by the motion of the rotating rotor and the helicity can be maintained by means of the cylindrical extension. The orientation is improved by the possible interior cooling of the material to be extruded.

An essential feature of the present invention is that the extrusion product can be cooled into the product form at the same time as it is crystallized, i.e. the apparatus discharges a finished product that thereafter does not necessarily have to be subjected to any operations for increasing its strength. However, the radial orientation is preferably improved by treatment with a mandrel, and the axial orientation is adjusted with a drawing device to the desired level, which is preferably about 50% lower than in the radial direction.

An advantage of the invention is that, when several relatively thin layers are prepared, they can be cooled and the orientation can thus be frozen. This is both very expensive and difficult with the conventional extrusion techniques. In the arrangement according to the invention, it is possible for example to prepare two thin layers and to perform the intercooling with one machine and to manufacture more layers with another machine. Due to the compact structure of the machine, the saving in space and money is significant.

For the purpose of supplying preferably several thin layers of plastic, the extrusion apparatus comprises at least two rotors provided with for example cylindrical extensions and stators surrounding the rotors, the directions of rotation of successive rotors being mutually opposite. In such a case, it may also be preferable that between the rotors there are intercooling apparatuses for ensuring that the orientation of the thin layers is frozen.

Especially when plastic material is being spun, crystallized or cross-linked, it is advantageous that the cylindrical extension of at least one rotor enlarges substantially conically in the direction of flow of the plastic material, and that there are means for conducting the plastic material that flows in the supply opening at the back of the rotor to the outer surface of the extension and thus to be mixed with the plastic material flowing in the supply opening at the front of the rotor, and that there are means for conducting the plastic material on the outer surface of the extension further through the extension and into its interior.

If the extrusion apparatus is intended for coating an existent product, for example a cable, the inlet end of the extrusion conduit preferably comprises a cooling device for the initial cooling of the product conducted into the conduit.

On the other hand, if the extrusion apparatus is intended for the production of a plastic pipe, the extrusion conduit is provided with a cooling mandrel.

In a preferred embodiment of the method according to the invention, a cylindrical preform that exits the extrusion apparatus is drawn with a drawing device over a tempered mandrel following the extrusion apparatus in such a way that the stretching of the plastic molecules in the circumferential direction increases further, but due to the simultaneous axial stretching, the orientation angle has a value that is below the original, preferably the aforementioned 50 to 60°.

The plastic material fibers can be spun and crystallized on a product moving through a cold mandrel or extrusion apparatus.

The mixture of cross-linked and non-cross-linked plastic material can be heated to the cross-linking temperature by means of a hot mandrel.

It is also possible to start the method at a higher temperature and to form a product with a standard diameter that is drawn to the other devices, such as a cooling basin, in the production line, whereafter the manufacturing temperature of the product is lowered near the orientation temperature, so that the orientation can be made permanent.

BRIEF DESCRIPTION OF THE DRAWINGS

In the following, the invention will be described in greater detail with reference to the accompanying drawings, in which.

DETAILED DESCRIPTION

Figure 1:
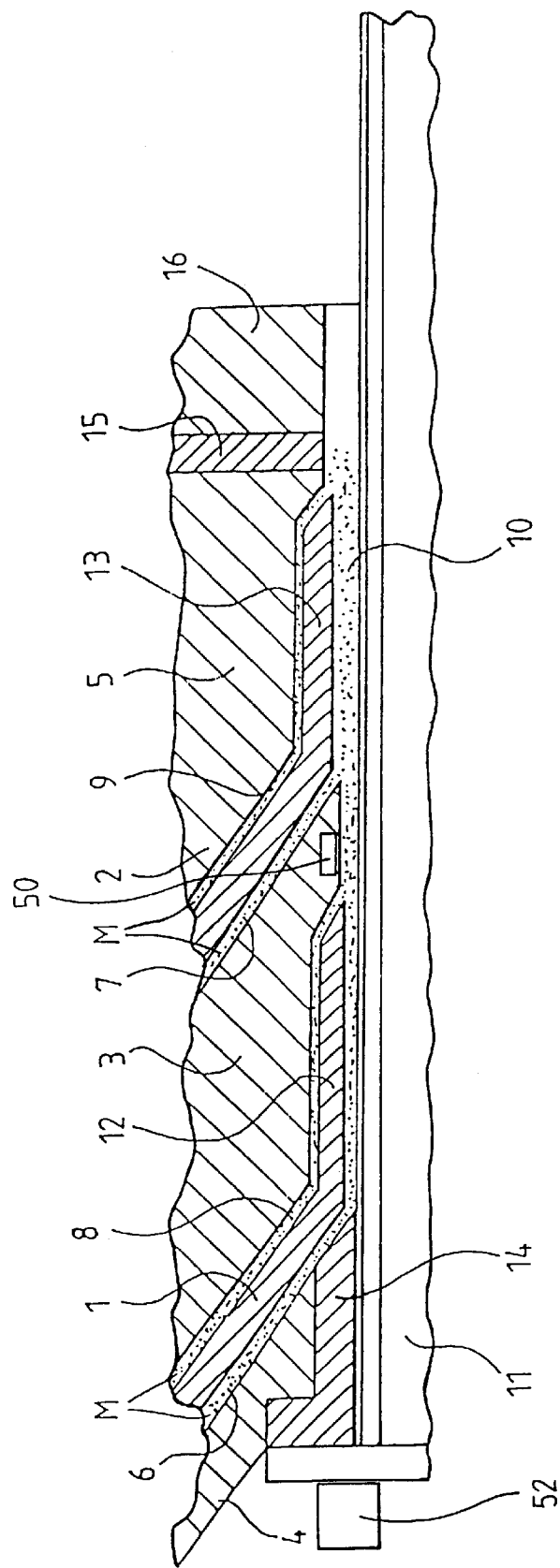
FIG. 1 shows an extrusion apparatus provided with two rotors.

FIG. 1 shows an extrusion apparatus according to the invention for preparing a plastic pipe comprising several thin plastic layers or for coating a product, such as a cable or a tube, with several thin plastic layers. This extrusion apparatus comprises two conical rotors 1 and 2, stators 3, 4 and 5 that separate the rotors from each other and surround them, and supply openings 6, 7, 8 and 9 between the rotors and the stators for pressing the plastic material M to be extruded into an extrusion conduit 10. The extrusion conduit 10 is formed in this case of an annular space situated between an opening extending through the extrusion apparatus and a cooling mandrel 11 pushed through the opening. The cooling mandrel 11 can be used at least in a case where a new multilayer pipe is being formed on it.

The rotors 1 and 2 are arranged to rotate in opposite directions, and each rotor comprises a cylindrical extension 12, 13 extending to the extrusion conduit 10 for orienting and crystallizing the plastic material M coming from the supply openings 6, 7, 8 and 9. The hot plastic material that exits the supply openings is oriented and crystallized between the extensions 12, 13 and the cold cooling mandrel 11. The layer thickness of the plastic material that is to be laminated and that arrives from each supply opening is preferably about 1 mm.

The beginning of the extrusion conduit 10 is closed with thermal insulation 14, and at the outlet end of the extrusion conduit there is another thermal insulation 15 so that no thermal losses would occur in the areas of the extrusion apparatus where the plastic material M should be in a molten state. After the second thermal insulation 15, the outlet end of the extrusion apparatus in turn comprises a cooling nozzle 16 for cooling the finished product that exits the apparatus.

With reference to FIG. 1, it should be noted that in some cases it might be preferable to use an arrangement employing several successive extrusion apparatuses provided with one rotor and comprising intercooling devices between the extrusion apparatuses, so that sufficient cooling could be provided between the different layers of plastic material.

Figure 2:
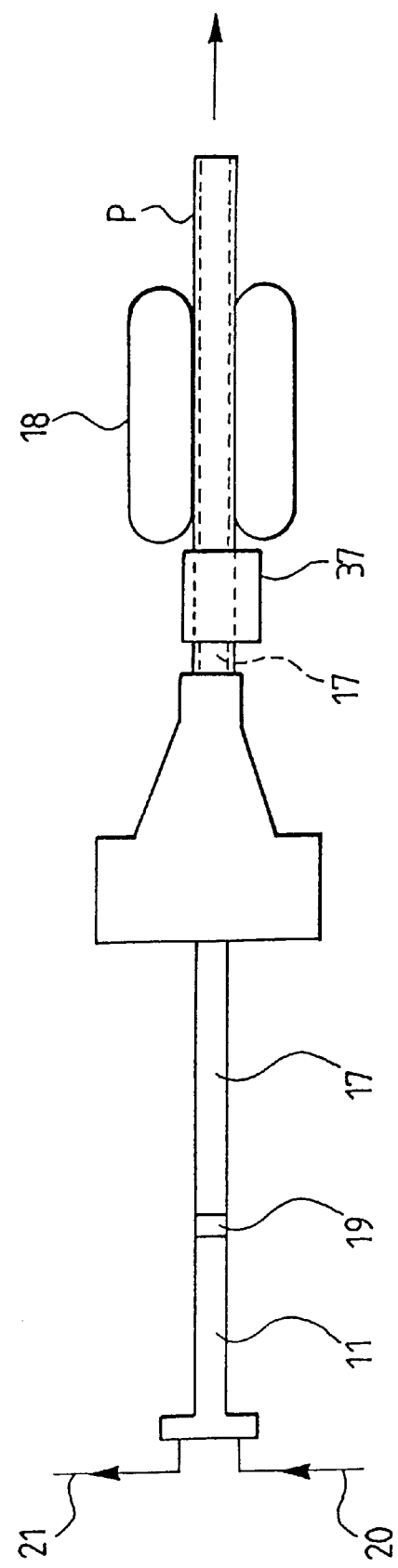
FIG. 2 shows the starting of a process in connection with an extrusion apparatus according to the invention.

FIG. 2 shows an arrangement with which the process for manufacturing a pipe can be started in an apparatus of FIG. 1. The end of the mandrel 11 then comprises a cold starting rod 17 that is made of for example aluminum and that is drawn with a drawing device 18 connected to the end of the extrusion apparatus until the mandrel 11 is in place, whereupon a connector 19 connected between the mandrel 11 and the starting rod 17 disengages the starting rod from the mandrel 11, whereafter a crystallized pipe P begins to be formed.

The mandrel 11 can be cooled by means of water circulation arranged at its end, whereupon the inlet of water is denoted by reference numeral 20 and the outlet by reference numeral 21.

For the purpose of cooling the product arriving from the extrusion apparatus, there is a cooling basin 37 before the drawing device.

When existing products are coated, the use of a mandrel 11 is not possible and therefore the initial cooling of the product to be coated must be performed for example by means of a cooling device placed at the inlet end of the extrusion apparatus.

The apparatus according to the invention is particularly applicable for implementing a method wherein the rotors 1 and 2 are rotated so fast that the helical orientation of the plastic material has almost the same direction as the circumference, whereafter the plastic pipe exiting the extrusion apparatus is drawn with the drawing device 18 in such a way that the orientation of the plastic molecules in the circumferential direction is reduced so that the orientation angle of the finished product will be smaller, preferably about 50 to 60°, whereupon the radial strength will be almost double the axial strength.

Figure 3:
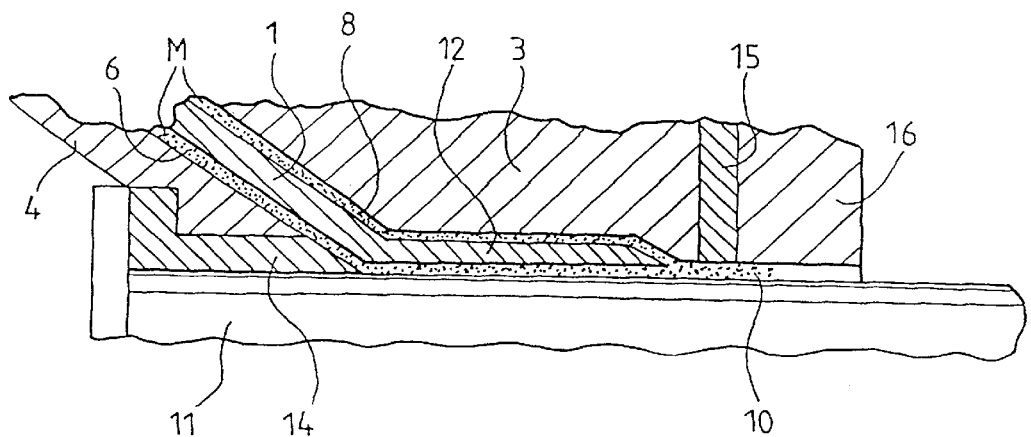
FIG. 3 shows an extrusion apparatus provided with one rotor.

The apparatus of FIG. 3 differs from the apparatus of FIG. 1 only in that it comprises one rotor (rotor 1) and correspondingly two stators (stators 3 and 4). With this apparatus it is possible to prepare only a two-layer pipe, whereas with the apparatus of FIG. 1 a four-layer pipe can be manufactured.

Figure 4:
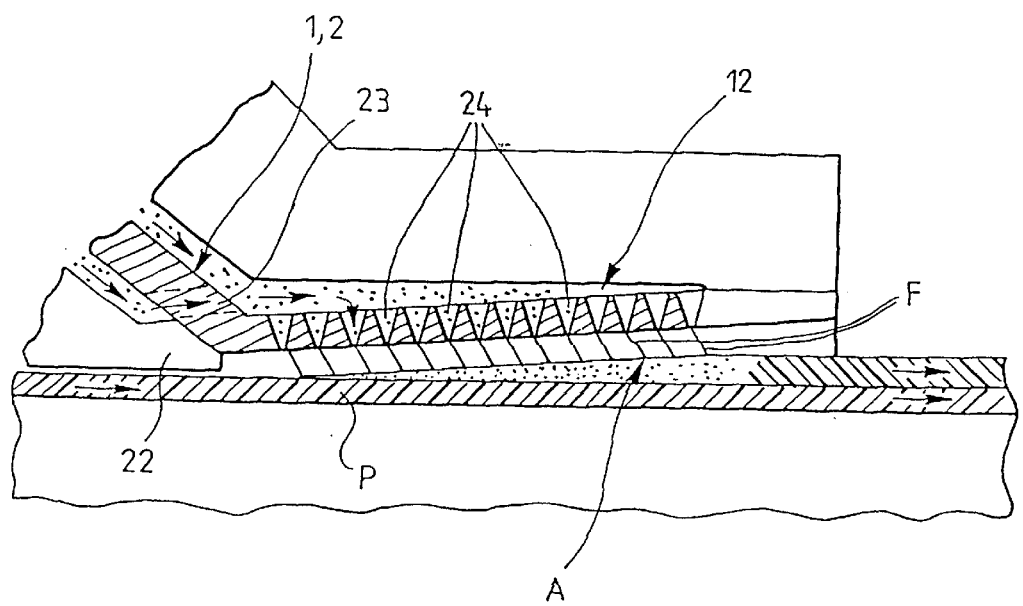
FIGS. 4 to 6 show embodiments of the rotor extension and its surroundings.
Figure 5:
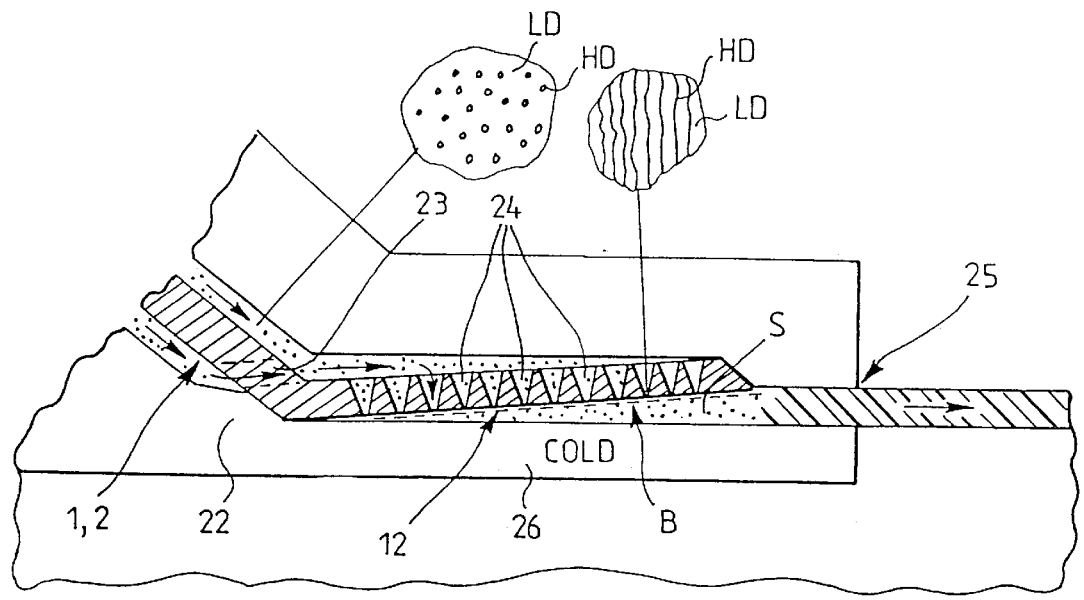
Figure 6:
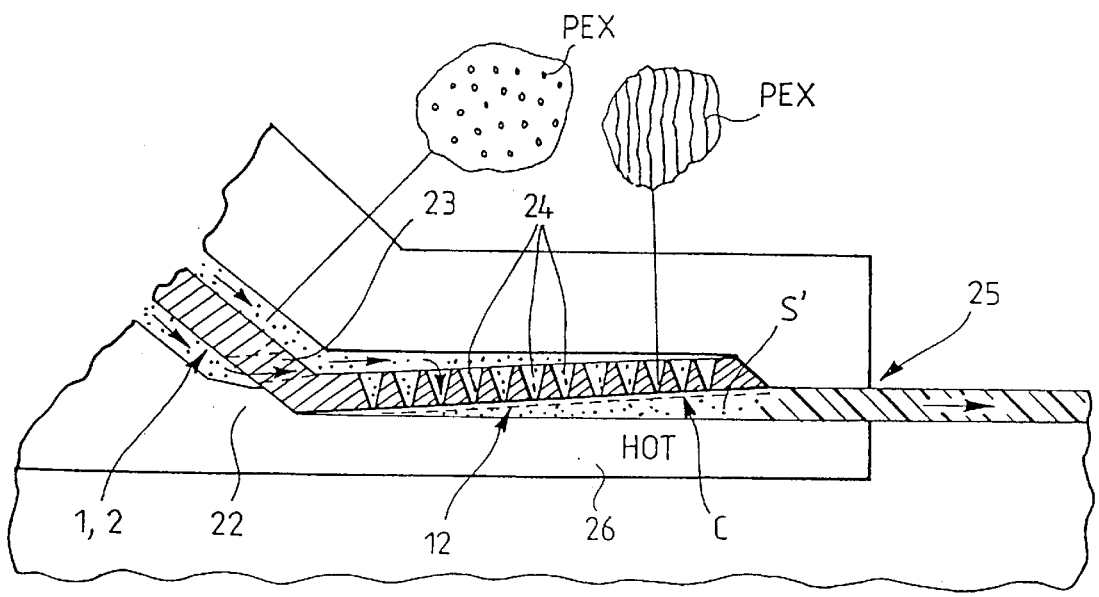

FIGS. 4 to 6 show some embodiments of the rotor extension and its surroundings. In all these embodiments the cylindrical extension 12, 13 of the rotor 1, 2 enlarges substantially conically in the direction of flow of the plastic material M. There are also means 22, 23 for conducting the plastic material flowing in the supply opening 6, 7 at the back of the rotor to the outer surface of the extension 12, 13 and thus to be mixed with the plastic material flowing in the supply opening 8, 9 at the front of the rotor, and means 24 for conducting the plastic material on the outer surface of the extension further through the extension 12, 13 and into its interior. The aforementioned means consist of a stator extension 22 closing the supply opening 6, 7 situated at the back, apertures 23 that pass through the rotor 1, 2 and that are adjacent to the stator extension, and apertures 24 passing through the rotor extension 12 and tapering in the direction of flow of the plastic material, i.e. towards the axis of the extruder. The end of the extension 22 is sealed to the frame of the extrusion apparatus in such a way that the entire flow of plastic material upstream of the extension 22 is transferred to the product to be prepared or coated solely via the apertures 24 of the extension 22. It must be noted that in an apparatus with several rotors such an arrangement can be provided in one (for example the last) rotor or in several rotors.

FIG. 4 shows a situation where the plastic material fibers F passing through the apertures 24 are spun on a cold pipe P. The spinning may also be performed on a cold mandrel (for example the mandrel 11). In this case, it may also be possible to use pure polymer.

In the case of FIG. 5, the mixture S of plastic material is crystallized on a cold mandrel 26 following the stator, and the resultant layer or product arrives at the extrusion conduit 25 from which it is pulled out. In this case, the plastic material mixture S is preferably formed of a composition of LD and HD plastics. An advantageous blending agent to be tempered with the matrix plastic is for example liquid crystalline polymer (LCP plastic) that can be defibered easily. The figure also shows how the plastic particles become fiber-like as they pass through the apertures 24 in the extension 22.

The example of FIG. 6 differs from FIG. 5 in that in the former figure the mixture S' of cross-linked and non-cross-linked plastic material, preferably polyethylene, is heated to the cross-linking temperature by means of a hot mandrel 26.

In the apertures 24, i.e. the defibering apertures, where the rate increases for example to 100-fold, the orientation increases correspondingly and the rotating shearing further increases the orientation.

Plastic can be made to flow through the apertures 23 and 24 in such a way that there is a smaller pressure on the side of the flow direction. This is achieved in such a way that the flow is throttled on the pressure side, or the supply opening on this side is closed entirely.

It must be noted that the frost line B and the cross-linking line C in FIGS. 5 and 6 are very close to the aforementioned defibering apertures 24. In FIG. 4, where the fibers are spun, the adhesion and frost line A is situated slightly further from these apertures.

The essential feature in the case of FIGS. 4 to 6 is that the viscosities of the plastics do not have to be different, but the drops stretch due to the increased rate.

It should also be noted that in the case of the conical extruder concerned, the ratio of the yield and the speed of rotation can be adjusted, so that the fibers can be stretched in the desired manner.

Figure 7:
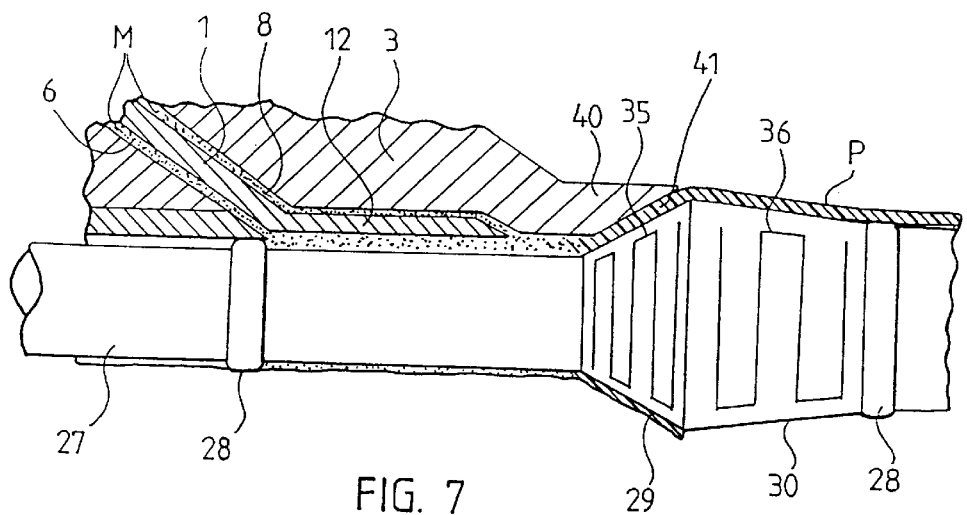
FIGS. 7 and 8 show additional applications of an extrusion apparatus according to the invention.
Figure 8:
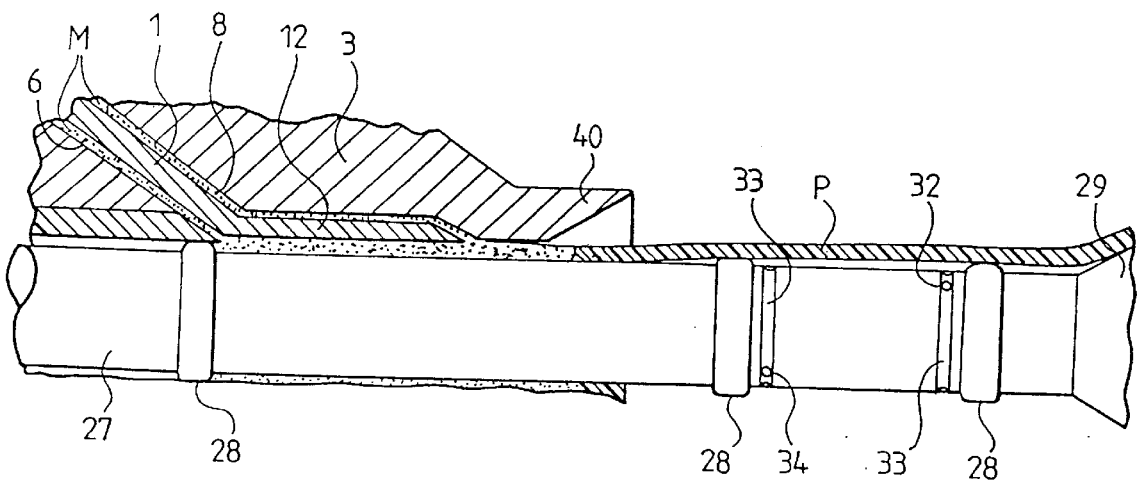

FIGS. 7 and 8 show some additional applications of a conical extruder according to the invention. A central hole, i.e. in this case a central extrusion conduit 10, extending through an extrusion apparatus that is essentially of the kind shown in FIG. 3 comprises an axially movable hollow rod or mandrel 27 which is provided with at least one expansive seal 28 that is placed against the inner surface of the product to be extruded, i.e. the pipe P, and that comprises at the end a mandrel cone 29.

FIG. 7 shows a control cone 30 that has a contracting diameter and that follows the mandrel cone 29, and heating/cooling circuits 35 and 36 contained in the mandrel cone 29 and the control cone 30 for heating and/or cooling the cones 29 and 30 and the plastic material passing over them. The nozzle section 40 of the extrusion apparatus may extend over a part of the ascending cone 29, over the highest point of the cone or even above it. A duct 41 situated between the nozzle section 40 and the cone 29 may be of even thickness or it may slightly taper towards the top of the cone 29. After the cone 30 there may be one more seal 28, whereupon lubricating liquid circulation may be arranged between the first and the last seal.

FIG. 8 also shows the possible formation of a tempering zone between the two seals 28. This is realized by circulating a liquid between the seals 28 by means of liquid inlet and outlet openings 32, 34 formed in the mandrel 27 and ring grooves 33 connected thereto. The purpose of the ring grooves 33 is to circulate the liquid as efficiently as possible. These tempering means are not shown in FIG. 7 for the sake of clarity.

The mandrel 27 of FIGS. 7 and 8 is also used in the orientation of the pipe P, whereupon the mandrel 27 acts partly as an interior tempering mandrel and its motion is utilized especially during the starting. Therefore FIG. 7 shows the starting stage of pipe manufacture and FIG. 8 shows a later stage where the pipe that has already been cooled slides over the mandrel cone 29. The mandrel 27 that is moved in the longitudinal direction can preferably also be used to adjust the correct temperature. When the rate of extrusion is high, for example a suitable cross-linking time can be achieved by increasing the length of the mandrel 27 to be heated. The temperature can be adjusted either with direct convection between the outer surface of the mandrel 27 and the inner surface of the pipe P, or then a zone can be separated between the seals 28, in which zone a cooling fluid is circulated at a suitable temperature. Suitable liquids include for example water, silicone oil or glycol. This arrangement also provides the advantage that the inner surface of the pipe can be provided with a film, which decreases the friction between the pipe P and the extension 29 of the mandrel.

The essential feature is that the outer diameter of the mandrel 27 is almost equal to the inner diameter of the plastic pipe P exiting the extrusion conduit 10, so that the pipe P can be allowed to slide along the outer surface of the mandrel 27 and a section of the pipe P can thus be enlarged with the mandrel.

The length of the mandrel 27 and thus the tempering and reaction time are adjusted according to the rate of extrusion.

The expansive seals 28 are also intended for the purpose that the variation in the wall thickness of the pipe P can be taken into account and that the pipe P can be beaded, i.e. oriented, with the seal 28, if required. These seals are thus not intended to be used in the run of pipes with unequal inner diameters.

As regards FIGS. 7 and 8, it should also be noted that the arrangement disclosed therein can naturally also be applied in other extruders according to the invention and not only in the exemplary extruder of FIG. 3.

Figure 9:
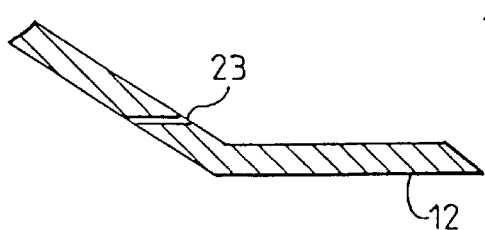
FIGS. 9 to 13 show alternative embodiments of the rotor.
Figure 10:
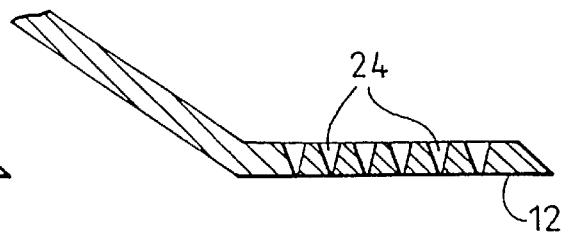
Figure 11:
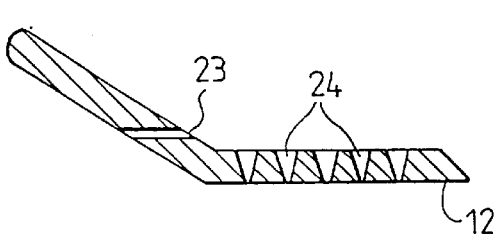
Figure 12:
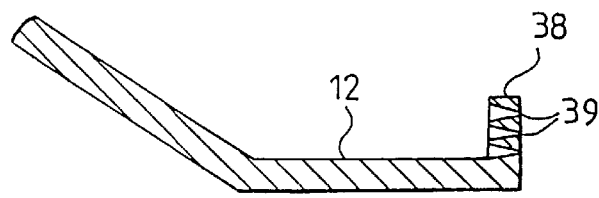
Figure 13:
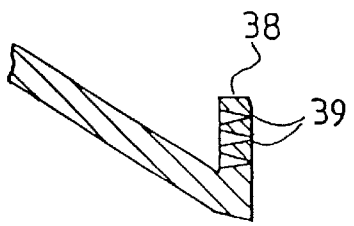

FIGS. 9 to 13 show some alternative rotor embodiments. FIGS. 9 to 11 show how the rotor and/or its extension 12 may comprise apertures 23, 24 passing through the rotor or extension for defibering and/or orienting the plastic material. There may also be apertures 23, 24 in a rotor provided with a substantially horizontal extension. The rotor of FIGS. 9 to 11 may also be extended by means of an annular flange 38, as shown in FIG. 12, that may comprise defibering and/or orienting openings 39. The flange 38 may also be attached to a rotor comprising no extension, as shown in FIG. 13.

The invention is described above only by way of example, and a person skilled in the art can implement the details thereof in several alternative manners within the scope of the appended claims. Therefore, for example the number of the rotors may vary as the need arises, and there may be intercooling apparatuses 50 between the rotors, if necessary, for ensuring that the orientation of the thin plastic layers is frozen. Moreover, the inlet end of the extrusion conduit 10 may comprise a cooling device 52 for the initial cooling of the product conducted into the conduit.

What is claimed is:

1. An extrusion apparatus comprising:
   (a) at least one conical stator;
   (b) at least one conical rotor, said rotor comprising orienting means for defibering or orienting a plastic material;
   (c) conduit means defining an opening in the apparatus for receiving an elongate product or mandrel, said conduit means being disposed in the apparatus such that, with the product or mandrel received in the opening, an extrusion conduit is defined in the opening between the product or mandrel and the rotor and stator, said rotor and stator being disposed with respect to one another to form a supply opening wherein the plastic material flows between the stator and rotor and is pressed into the extrusion conduit, said orienting means being disposed at an end of the rotor proximate to the extrusion conduit, said orienting means comprising a substantially cylindrical extension extending to the extrusion conduit and disposed at the end of the rotor.

2. An extrusion apparatus according to claim 1, wherein said orienting means comprise a plurality of apertures passing through the rotor.

3. An extrusion apparatus according to claim 1, wherein said orienting means comprise a plurality of apertures passing through the cylindrical extension.

4. An extrusion apparatus according to claim 1 comprising an annular flange at the end of the cylindrical extension.

5. An extrusion apparatus according to claim 4, wherein the annular flange comprises a plurality of openings passing through it.

6. An extrusion apparatus according to claim 1, wherein the cylindrical extension enlarges substantially conically in the direction of flow of the plastic material, said apparatus comprising first means for conducting plastic material flowing in the supply opening from a back of the rotor to an outer surface of the cylindrical extension for mixing with plastic material flowing in the supply opening at a front of the rotor, and second means for conducting plastic material on the outer surface of the cylindrical extension through the cylindrical extension and into an interior of the cylindrical extension.

7. An extrusion apparatus according to claim 6, wherein the first and second means collectively comprise a stator extension disposed in back of the rotor that obstructs the supply opening and a plurality of apertures passing through the cylindrical extension.

8. An extrusion apparatus according to claim 1, wherein the apparatus also comprises at least a second rotor and a second stator, said at least one stator and second stator surrounding the at least one rotor, said apparatus further comprising means for rotating the at least one rotor and second rotor in opposite directions.

9. An extrusion apparatus according to claim 8, further comprising means disposed between the at least one rotor and the second rotor for cooling plastic material pressed into the extrusion conduit whereby to fix the orientation of the plastic material.

10. An extrusion apparatus according to claim 1, comprising the elongate product received in the opening and cooling means at an inlet end of the extrusion conduit for an initial cooling of plastic material pressed into the conduit.

11. An extrusion apparatus according to claim 1, comprising the mandrel received in the opening, said mandrel being heated or cooled.

12. An extrusion apparatus according to claim 11, wherein the mandrel is an axially movable rod that extends through the extrusion apparatus and that comprises at its end a mandrel cone, said mandrel being heated or cooled.

13. An extrusion apparatus according to claim 12, wherein the rod comprises at least one seal that is expandable against an inner surface of either the extrusion apparatus or plastic material to be extruded.

14. An extrusion apparatus according to claim 13, wherein the rod is hollow and the apparatus further comprises a second seal, means for warming or cooling the rod or both, means for expanding the at least one seal, and means for forming a tempering zone between the at least one seal and the second seal.

15. An extrusion apparatus according to claim 1 comprising, at an outlet end of the extrusion conduit, thermal insulation and a cooling nozzle.

16. A method for orienting plastic material during the formation or coating of a cylindrical plastic product comprising:

(a) providing an extrusion apparatus comprising at least one conical stator, at least one conical rotor comprising means for defibering or orienting the plastic material, an extrusion conduit and a supply opening between the stator and the rotor from which the plastic material is pressed into the extrusion conduit;

(b) introducing the plastic material into the supply opening and rotating the at least one rotor sufficiently rapidly to impart to molecules of the plastic material a helical orientation having a direction that is almost the same as a circumference of the cylindrical plastic product; and (c) drawing the oriented plastic material from the extrusion apparatus in a way that reduces the orientation of the plastic molecules in the circumferential direction whereby the cylindrical plastic product or a coating thereon has an orientation angle that is smaller than that of the oriented plastic material.

17. A method according to claim 16, wherein the drawing in step (c) comprises drawing the oriented plastic material over a tempered mandrel to stretch the plastic molecules simultaneously in the circumferential direction and in an axial direction.

18. A method according to claim 16, wherein the plastic material comprises fibers, said method comprising coating the cylindrical plastic product by passing said product through the extrusion apparatus and spinning and crystalizing the fibers of the plastic material thereon with cooling of the product.

19. A method according to claim 16, wherein the plastic material is a mixture of crosslinked material and the method comprises heating the mixture to a crosslinking temperature with a hot mandrel.

20. A method according to claim 17, comprising adjusting the length of the tempered mandrel.

21. A method according to claim 16, comprising tempering the oriented plastic material by decreasing a temperature thereof in a tempering zone.

22. A method according to claim 21, wherein the temperature is decreased by increasing a length of the tempering zone.

* * * * *